US006153346A

United States Patent [19]

[11] Patent Number: 6,153,346
[45] Date of Patent: *Nov. 28, 2000

Maehata et al.

[54] ELECTROSTATIC IMAGE DEVELOPING TONER, PROCESS FOR THE PRODUCTION THEREOF, ELECTROSTATIC IMAGE DEVELOPER AND PROCESS FOR THE FORMATION OF IMAGE

[75] Inventors: Hideo Maehata; Shuji Sato; Yasuo Kadokura; Masaaki Suwabe; Hisae Yoshizawa; Yasuo Matsumura; Takao Ishiyama, all of Minami Ashigara, Japan

[73] Assignee: Fuji Xerox Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/256,773

[22] Filed: Feb. 24, 1999

[30] Foreign Application Priority Data

| | | | |
|---|---|---|---|
| Feb. 27, 1998 | [JP] | Japan | 10-047780 |
| Oct. 29, 1998 | [JP] | Japan | 10-308421 |

[51] Int. Cl.[7] ..................... C03C 9/00

[52] U.S. Cl. ..................... 430/110; 430/111

[58] Field of Search ..................... 430/110, 111

[56] References Cited

U.S. PATENT DOCUMENTS

| | | | |
|---|---|---|---|
| 5,439,770 | 8/1995 | Taya et al. | 430/111 |
| 5,504,272 | 4/1996 | Uchiyama et al. | 430/111 |

FOREIGN PATENT DOCUMENTS

| | | |
|---|---|---|
| 62-73276 | 4/1987 | Japan . |
| 5-27476 | 2/1993 | Japan . |
| 5-40366 | 2/1993 | Japan . |
| 6-250439 | 9/1994 | Japan . |
| 6-282105 | 10/1994 | Japan . |
| 10-20552 | 1/1998 | Japan . |

*Primary Examiner*—Mark Chapman
*Attorney, Agent, or Firm*—Oliff & Berridge, PLC

[57] ABSTRACT

Disclosed is an electrostatic image developing toner comprising a binder resin and a coloring agent, which exhibits a volume-average particle distribution GSDv of not more than 1.26 and an acid value of from 1.0 to 20 mgKOH/g and contains a surface active agent in an amount of not more than 3% by weight in the particulate toner and an inorganic metal salt having an electric charge having a valence of two or more in an amount of from not less than 10 ppm to not more than 1% by weight.

18 Claims, No Drawings

ELECTROSTATIC IMAGE DEVELOPING TONER, PROCESS FOR THE PRODUCTION THEREOF, ELECTROSTATIC IMAGE DEVELOPER AND PROCESS FOR THE FORMATION OF IMAGE

FIELD OF THE INVENTION

The present invention relates to an electrostatic image developing toner for use in the development of an electrostatic latent image in electrophotographic process or electrostatic recording process, a process for the production thereof, an electrostatic image developer and a process for the formation of an image using the electrostatic image developer.

BACKGROUND OF THE INVENTION

Processes which comprise making an image data visible from an electrostatic image such as electrophotographic process are used in various fields. In electrophotographic process for example, an electrostatic image is formed on a photoreceptor at the charging and exposure step. The electrostatic latent image is then developed with a developer containing a toner. The toner image thus developed is transferred, and then fixed to give a visible image. The developers to be used in this process can be classified as binary developer consisting of a toner and a carrier and unitary developer comprising a magnetic toner or nonmagnetic toner alone. Such a toner is normally produced by a knead-grinding process which comprises melt-kneading a thermoplastic resin with a pigment, an electrostatic controller and a releaser such as wax, cooling the mixture, and finely grindirng the mixture, and then classifying the particles. If necessary, the particulate toner thus obtained may occasionally comprise a particulate inorganic material or particulate organic material attached to the surface thereof to have improved fluidity or cleaning properties.

On the other hand, as the society has been oriented towards information more and more, there has recently been a growing demand for provision of data documents prepared by various methods in the form of image having a higher quality. To this end, studies have been made of enhancement of image quality in various image formation methods. This demand has been given to all image formation methods, not excepting one using electrophotographic process. In electrophotographic process, it has been desired to reduce the particle diameter of toner particles and attain a sharp particle size distribution in order to realize an image having a higher precision in the formation of color image.

In the operation of digital full-color copying machines or printers for example, the color of a color image original is subjected to separation through various filters (B (blue), R (red), G (green)). Latent images composed of dots having a diameter of from 20 to 70 $\mu$m corresponding to the original are then subjected to development with the respective developer (Y (yellow), M (magenta), C (cyan), Bk (black)) by subtractive mixing action. This process requires that a larger amount of developers be transferred than by the conventional black-and-white copying machines. This process further requires that the development be effected corresponding to dots having a smaller diameter. Thus, it becomes more important to secure uniform chargeability including environmental dependence of charging, continuance of uniform chargeability, sharp particle size distribution and sufficient toner strength. Further, taking into account the growing demand for increase in the operation speed of these machines and energy saving, it has been desired to further lower the lowest temperature at which the toner image can be fixed. As obvious also from this fact, a toner having a small particle diameter with a sharpparticle size distribution has been desired.

However, in accordance with the grinding and classification process by the conventional knead-grinding method, the minimum particle diameter which can be actually realized is about 8 $\mu$m at smallest from the economical and technical standpoint of view. At present, various methods for producing a toner having a reduced particle diameter are under study. However, the grinding and classification method merely provides a small particle diameter having the same particle size distribution as that of the conventional products. The particle size distribution characteristics of the toner can be hardly improved. As a result, the presence of toner particles having a smaller particle size than the other side in the distribution worsens troubles such as stain on carrier and photoreceptor and toner scattering, making it difficult to realize both high quality and high reliability at the same time.

In order to solve these problems, the process for the production of toners using various polymerization processes other than knead-grinding process is under study. For example, the process for the preparation of toners by suspension polymerization process is described in JP-A-62-73276 (The term "JP-A" as used herein means an "unexamined published Japanese patent application") and JP-A-5-027476. However, the particle size distribution of the toner prepared by these processes is no better than that provided by the knead-grinding process no matter how it is controlled. In many cases, further classification is required. The toner obtained by these processes is also disadvantageous in that since the toner particles are in almost spherical form, the toner remaining on the photoreceptor or the like can be hardly removed, impairing the reliability in image quality.

Further, the process for the preparation of toner by emulsion polymerization process is described in JP-A-6-250439. However, this preparation process comprises preparing a particulate resin dispersion by an emulsion polymerization process using a surface active agent while preparing a coloring agent dispersion having a coloring agent dispersed in a solvent, mixing the two dispersions, adding a surface active agent having a polarity opposite to that of the foregoing surface active agent to the mixture so that the emulsion polymerization particles and coloring agent are agglomerated to a desired particle diameter, adding a surface active agent having the same polarity as that used in the preparation of the particulate resin to the agglomerate so that the agglomerated particles are stabilized to a desired particle diameter, and then heating the agglomerate to a temperature of not lower than the glass transition point of the binder resin so that it is fused to prepare a toner.

In accordance with the foregoing preparation process, not less than 80% of the residual surface active agent is added at the step of agglomerating the particulate resin and the particulate coloring agent and the subsequent heat-fusion step where the agglomerated particles are restabilized. Therefore, if the amount of the surface active agent to be used at the agglomeration step and the subsequent heat-fusion step is restricted to not more than a predetermined level to solve the foregoing various problems of the remaining surface active agent, some troubles occur. For example, these particles can be less fairly agglomerated, deteriorating the particle size distribution or producing unagglomerated particles. Further, these particles can be understabilized at the heat-fusion step, deteriorating its particle size distribution. Accordingly, mere reduction of the amount of the surface active agent to be used results in great problems in the production process.

Moreover, the toner particles obtained by these processes are advantageous in that they have an extremely excellent particle size distribution as compared with those obtained by polymerization processes such as conventional suspension polymerization process and can be obtained in amorphous form from the standpoint of cleaning properties. However, the toner obtained by emulsion polymerization process exhibits remarkably deteriorated moisture-absorption characteristics due to surface active agents remaining therein. As a result, the toner exhibits a deteriorated chargeability, a high environmental dependence and a deteriorated mechanical strength and hence leaves much to be desired in reliability and durability.

Further, the merely amorphous toner obtained by the foregoing process exhibits good cleaning properties but an insufficient transferability from the electrostatic image carrier that causes a remarkable drop of developability of toner.

SUMMARY OF THE INVENTION

The present invention is intended to solve the foregoing problems and hence provide an electrostatic image developing toner having excellent chargeability, resistance to environmental dependence, cleaning properties and transferability and a small particle diameter with a sharp particle size distribution, a process for the production thereof, an electrostatic image developer comprising the toner, and a process for the formation of a color image having a high quality and reliability.

The inventors made extensive studies of solution to these problems. As a result, these problems can be solved by the use of the following constitutions of the present invention.

(1) An electrostatic image developing toner comprising a binder resin and a coloring agent, which exhibits a volume-average particle distribution GSVd of not more than 1.26 and an acid value of from 1.0 to 20 mgKOH/g and contains a surface active agent in an amount of not more than 3% by weight in the particulate toner and an inorganic metal salt having an electric charge having a valence of two or more in an amount of not more than 1% by weight, preferably not less than 10 ppm.

(2) The electrostatic image developing toner according to Clause (1), which comprises as at least a part of said binder resin a copolymer of styrene or derivative thereof, an acrylic monomer or methacrylic monomer and an ethylenically unsaturated acid monomer.

(3) The electrostatic image developing toner according to Clause (2), wherein said ethylenically unsaturated acid monomer is an acrylic acid or methacrylic acid.

(4) The electrostatic image developing toner according to any one of Clauses (1) to (3), wherein said particulate toner contains a releaser resin.

(5) The electrostatic image developing toner according to any one of Clauses (1) to (4), wherein at least one of said inorganic metal salts is an inorganic aluminum salt.

(6) The electrostatic image developing toner according to any one of Clauses (1) to (5), wherein at least one of said inorganic metal salts is a polymer of inorganic metal salts.

(7) The electrostatic image developing toner according to any one of Clauses (1) to (6), wherein said particulate toner has a volume-average particle diameter of from 1 to 10 $\mu$m and a shape factor SF of from 100 to 140.

(8) The electrostatic image developing toner according to any one of Clauses (1) to (7), wherein said particulate toner has a shape factor SF of from 125 to 140.

(9) A process for the production of an electrostatic image developing toner, which comprises mixing at least one dispersion of particulate resin and at least one dispersion of coloring agent, agglomerating said particulate resin and said coloring agent with an inorganic metal salt having an electric charge having a valence of two or more to prepare an agglomerate dispersion, and then heating said dispersion to a temperature of not lower than the glass transition point of said resin so that said agglomerate is fused to form a particulate toner.

(10) A process for the production of an electrostatic image developing toner, which comprises mixing at least one dispersion of particulate resin, at least one dispersion of coloring agent and at least one releaser dispersion, agglomerating said particulate resin and said coloring agent with an inorganic metal salt having an electric charge having a valence of two or more to prepare an agglomerate dispersion, and then heating said dispersion to a temperature of not lower than the glass transition point of said resin so that said agglomerate is fused to form a particulate toner.

(11) The process for the production of an electrostatic image developing toner according to Clause (9) or (10), which comprises adding at least one dispersion of particulate resin to said agglomerate dispersion to cause said particulate resin to be attached to the surface of said agglomerate, and then heat-fusing the material to form a particulate toner.

(12) The process for the production of an electrostatic image developing toner according to any one of Clauses (9) to (11), wherein the average particle diameter of said particulate resin and said coloring agent is not more than 1 $\mu$m.

(13) The process for the production of an electrostatic image developing toner according to any one of Clauses (9) to (12), wherein at least a part of said particulate resin is produced by the copolymerization of styrene and/or derivative thereof, an acrylic monomer and/or methacrylic monomer and an ethylenically unsaturated acid monomer.

(14) The process for the production of an electrostatic image developing toner according to Clause (13), wherein said copolymer of styrene and/or derivative thereof, an acrylic monomer and/or methacrylic monomer and an ethylenically unsaturated acid monomer is produced by emulsion polymerization.

(15) The process for the production of an electrostatic image developing toner according to Clause (13) or (14), wherein said unsaturated acid monomer is an acrylic acid or methacrylic acid.

(16) The process for the production of an electrostatic image developing toner according to any one of Clauses (9) to (15), wherein at least one of said inorganic metal salts is an inorganic aluminum salt.

(17) The process for the production of an electrostatic image developing toner according to any one of Clauses (9) to (16), wherein at least one of said inorganic metal salts is a polymer of inorganic metal salts.

(18) The process for the production of an electrostatic image developing toner according to any one of Clauses (9) to (17), which comprises forming said agglomerate in an aqueous medium, adjusting, after getting the appropriate particle size of an agglomerate, the pH value of said agglomerate dispersion within the range of from 2.0 to 14 to stop the progress of the agglomeration of particles so that said agglomerate dispersion is stabilized, and then heat-fusing said agglomerate.

(19) The process for the production of an electrostatic image developing toner according to anyone of Clauses (9)

to (18), which comprises heat-fusing said agglomerate to form a particulate toner, and then washing said particulate toner with an aqueous alkali and/or acidic water.

(20) An electrostatic image developer made of a toner and a carrier, characterized in that as said toner there is used an electrostatic image developing toner according to any one of Clauses (1) to (8).

(21) A process for the formation of an image which comprises the steps of forming an electrostatic latent image on an electrostatic carrier, developing said electrostatic latent image with a developer on a developer carrier to forma toner image, and transferring said toner image onto a transfer material, characterized in that as said developer there is used an electrostatic image developer according to Clause (10).

(22) The process for the formation of an image according to Clause (20), wherein said electrostatic developing toner remaining on said electrostatic latent image carrier is removed by a blade cleaning method.

(23) The process for the formation of an image according to Clause (20) or (21), which comprises a cleaning step of recovering said electrostatic image developing toner remaining on said electrostatic latent image carrier and a recycling step of returning said electrostatic image developing toner recovered at said cleaning step to the developer layer.

DETAILED DESCRIPTION OF THE INVENTION

The inventors made extensive studies of the provision of an electrostatic image developing toner having excellent chargeability (charge properties), resistance to environmental dependence, cleaning properties and transferability (transferring properties) and a small particle diameter with a sharp particle size distribution and a process for the formation of an image which allows the formation of a color image free of fog having a high quality and reliability without causing the scattering of toner or any other troubles.

In accordance with the present invention, a particulate resin dispersion and a coloring agent dispersion are mixed. To the mixture is then added a flocculant containing at least an inorganic metal salt having an electric charge having a valence of two or more soluble in the dispersion medium of the mixture to form an agglomerate. The agglomerate is then heated to a temperature of not lower than the glass transition point of the resin so that it is fused to form a particulate toner. During this procedure, the amount of surface active agents incorporated in the toner particles is controlled to not more than a predetermined value. The content of the divalent or higher inorganic metal salt used in agglomeration is controlled to a predetermined range. Ion crosslinking is introduced into the binder resin. In this manner, the moisture-absorption characteristics of the toner can be improved. As a result, an electrostatic image developing toner having excellent charging stability, resistance to environmental dependence and a small particle diameter with a sharp particle size distribution can be provided. The use of the electrostatic image developing toner of the present invention makes it possible to form a color image having a high quality and reliability. The adjustment of the shape factor SF of the toner to a range of from 125 to 140 in addition to the foregoing requirements makes it possible to provide an electrostatic image developing toner having better chargeability, cleaning properties and transferability.

The electrostatic image developing toner of the present invention exhibits a volume-average particle size distribution GSDv of not more than 1.26, preferably not more than 1.25 and an acid value of from 1.0 to 20 mgKOH/g and contains a surface active agent remaining in the toner particles in an amount of not more than 3% by weight, preferably not more than 1% by weight and an inorganic metal salt having an electric charge having a valence of two or more in an amount of from not less than 10 ppm to not more than 1% by weight, preferably from not less than 10 ppm to not more than 0.5% by weight.

If the acid value of the electrostatic image developing toner of the present invention falls below 1 mgKOH/g, a sufficient chargeability cannot be obtained. On the contrary, if the acid value of the electrostatic image developing toner of the present invention exceeds 20 mgKOH/g, the resulting toner exhibits deteriorated moisture-absorption characteristics that cause troubles in chargeability such as poor charging and deteriorated resistance to environmental dependence.

If the content of the divalent or higher inorganic metal salt remaining in the particulate toner exceeds 1% by weight, it is disadvantageous from the standpoint of fixability because it causes a remarkable rise in the melt viscosity of the toner during fixing. The upper limit of the content of the inorganic metal salt is preferably 0.5% by weight. Further, the lower limit of the content of the inorganic metal salt is preferably 10 ppm. By thus allowing the inorganic metal salt to be incorporated in the toner, a sufficient ion crosslinking can be formed, making it possible to drastically improve the moisture-absorption characteristics of the toner.

The particulate toners produced by the conventional production process which comprises the agglomeration of a particulate resin with a surface active agent, and then heat-fusing the agglomerated particles are disadvantageous in that they exhibit deteriorated moisture-absorption characteristics resulting in poor charging and great resistance to environmental dependence. In accordance with the present invention, the content of surface active agents remaining in the toner particles is controlled to not more than a predetermined value, and one or more inorganic metal salts having an electric charge having a valence of two or more are used during agglomerapton. In this manner, ion crosslinking can be introduced into the toner particles, making it possible to drastically the moisture-absorption characteristics of the toner particles. The present invention has thus been worked out on the basis of this knowledge.

In the conventional process, the majority, i.e., about 80% of the surface active agent to be used is added as a flocculant at the step of agglomerating particulate resin or the like. The balance of the surface active agent is then added as a stabilizer during heat fusion of agglomerated particles which have been restabilized to a desired particle diameter.

On the other hand, in the most preferred embodiment of the present invention, the amount of surface active agents which are likely to remain is minimized, that is, only an inorganic metal salt having a valence of two or more is used to agglomerate the particulate resin or the like in an aqueous medium, and the pH value of the dispersion of agglomerated particles is controlled to a range of from 2 to 14, preferably from 3 to 10, so that the agglomerated particles are stabilized before heat fusion. In this case, if the pH value for stabilization falls below 2 or exceeds 14, the material of particulate resin used undergoes undesirable hydrolysis resulting in the deterioration of chemical stability.

Further, the toner of the present invention can be adjusted to a shape factor of from 100 to 140, preferably from 125 to 140, to provide an electrostatic image developing toner having better chargeability, cleaning properties and transferability. If the shape factor of the toner particles falls below 125, the cleaning properties of toner particles remaining on the electrostatic image carrier may be worsen, impairing the reliability of toner image. On the contrary, if the shape factor of the toner particles exceeds 140, the efficiency of transfer of the toner image from the electrostatic image carrier supporting the toner image to the transfer material tends to be deteriorated, impairing the reliability of the image quality, and the change in aging of the toner tends to be changeable, whereby fine powder is apt to be genereated. The term "cleaning properties" as used herein is based on cleaning by the most common blade process. If a particulate toner having a high sphericity as not more than 125 in terms of shape factor is used, the toner left untransferred can be easily passed through the cleaning blade, causing image defects.

As mentioned above, the electrostatic image developing toner and developer of the present invention have a good chargeability and excellent resistance to environmental dependence and cleaning properties. Further, the production process of the present invention makes it easy to obtain a particulate toner having a small particle diameter with a sharp particle size distribution. The use of the toner of the present invention makes it possible to form a high quality full-color image.

One of the reasons why the electrostatic image developing toner of the present invention can be provided with the foregoing inherent properties is that the agglomeration of the particulate resin, coloring agent and optionally releaser with a flocculent made of an inorganic petal salt having an electric charge having a valence of two or more during the production of the toner by agglomeration fusion process makes it possible to restrict the amount of surface active agent remaining in the toner to not more than 3% by weight, particularly not more than 1% by weight.

The inorganic metal salt to be used herein can be obtained by dissolving an ordinary inorganic metal compound or polymer thereof in a particulate resin dispersion. As the metal element constituting the inorganic metal salt there may be used one having an electric charge having a valence of two or more belonging to the groups 2A, 3A, 4A, 5A, 6A, 7A, 8, 1B, 2B and 3B of the periodic table (long period) so far as it can be dissolved in the system of agglomerated resin particles in the form of ion.

Specific preferred examples of the inorganic metal salt include metal salts such as calcium chloride, calcium nitrate, barium chloride, magnesium chloride, zinc chloride, aluminum chloride and aluminum sulfate, and inorganic metal salt polymers such as polyaluminum chloride, polyaluminum hydroxide and polycalcium sulfide. Particularly preferred among these inorganic metal salts are aluminum salts and polymers thereof. In general, the valence of the inorganic metal salt to be used should be two rather one or three or more rather than two to give a sharper particle size distribution. If inorganic metal salts having the same valence are given, a polymer type of inorganic metal salt is preferred.

The resin to be used as the particulate resin for the toner of the present invention is not specifically limited. Specific examples of the resin employable herein include homopolymers of monomers such as styrenes (e.g., styrene, parachlorostyrene, α-methylstyrene), acrylic monomers (e.g., methyl acrylate, ethyl acrylate, n-propyl acrylate, lauryl acrylate, 2-ethylhexyl acrylate), methacrylic monomers (e.g., methyl methacrylate, ethyl methacrylate, n-propyl methacrylate, lauryl methacrylate, 2-ethylhexyl methacrylate), ethylenically unsaturated acid monomers (e.g., acrylic acid, methacrylic acid, sodium styrenesulfonate), vinylnitriles (e.g., acrylonitrile, methacrylonitrile), vinyl ethers (e.g., vinylmethyl ether, vinyl isobutyl ether) and vinyl ketones (e.g., vinyl methyl ketone, vinyl ethyl ketone, vinyl isopropenyl ketone), copolymers of two or more of these monomers, mixtures thereof, nonvinyl condensed resins such as epoxy resin, polyester resin, polyurethane resin, polyamide resin, cellulose resin and polyether resin, mixtures thereof with the foregoing vinyl resins, and graft polymers obtained by the polymerization of vinyl monomers in the presence of these resins.

The toner of the present invention preferably comprises as at least a part of the binder resin, a copolymer of styrene or derivative thereof, an acrylic monomer or methacrylic monomer and an ethylenically unsaturated acid monomer.

The particulate resin dispersion to be used herein can be easily obtained by a polymerization process in a nonuniform dispersion system such as emulsion polymerization process, suspension polymerization process and dispersion polymerization process. Alternatively, any other processes can be employed such as one involving the mechanical mixing and dispersion of a product obtained by uniform polymerization such as solution polymerization and mass polymerization in a solvent in which the polymer cannot be dissolved together with a stabilizer.

For example, if a vinyl monomer is used, the desired particulate resin dispersion can be prepared by emulsion polymerization process or seed polymerization process in the presence of an ionic surface active agent, preferably in combination with a nonionic surface active agent. Any other resins which are oily and can be dissolved in a solvent having a relatively low solubility in water, if used, may be dissolved in the solvent, finely dispersed in water together with an ionic surface active agent or a high molecular electrolyte such as polyacrylic acid by means of a disperser such as homogenizer, and then subjected to evaporation of solvent at an elevated temperature or under reduced pressure to obtain the desired particulate resin dispersion.

Specific examples of the surface active agent employable herein include anionic surface active agents such as sulfuric acid ester-based surface active agent, sulfonate-based surface active agent and phosphoric acid ester-based surface active agent, cationic surface active agents such as amine salt-based surface active agent and quaternary ammonium salt-based surface active agent, nonionic surface active agents such as polyethylene glycol-based surface active agent, alkylphenol-ethylene oxide adduct-based surface active agent and polyvalent alcohol-based surface active agent, and various graft polymers. However, the present invention should not be limited to these surface active agents.

If emulsion polymerization is used to prepare a particulate resin dispersion, a small amount of an unsaturated acid such as acrylic acid, methacrylic acid, maleic acid and styrenesulfonic acid may be added-as a part of the monomer components to form a protective colloid layer on the surface of the finely divided particles. This is particularly advantageous because it allows soap-free polymerization. Even polymerization processes other than emulsion polymerization process must be conducted under the condition that the particle diameter of the particulate resin should essential lube sufficiently smaller than the target particle diameter at the time of termination of agglomeration (corresponding to the particle diameter of the toner). The particulate resin dispersion may be added at once. Alternatively, the particulate resin dispersion may be additionally added at once or batchwise after the agglomeration step so that it is attached to the surface of the agglomerated particles.

Further, at least one particulate releaser resin may be added as a part of the foregoing particulate resin component. Examples of the releaser employable herein include low molecular polyolefins such as polyethylene, polypropylene and polybutene, silicones, aliphatic acid amides such as oleic acid amide, erucic acid amide, ricinoleic acid amide and stearic acid amide, vegetable waxes such as carnauba wax, rice wax, candelilla wax, Japan wax and jojoba oil, animal waxes such as beeswax, mineral or petroleum waxes such as monlan wax, ozokerite, ceresin, paraffin wax, microcrystalline wax and Fischer-Tropsh wax, and modification products thereof.

These releasers may be added in an amount of 1 wt % to 20 wt %, preferably 3 wt % to 15 wt % based on the toner. If the amount of the releasers is too little, the releasing property of the toner tends to be insufficient. If the amount of the releasers is too much, the transparency of the image when fixed on an OHP sheet tends to be reduced.

These waxes may be dispersed in water with an ionic surface active agent or a high molecular electrolyte such as high molecular acid and high molecular base, and then finely divided by means of a homogenizer capable of providing a strong shearing force or a pressure-injecting type disperser while being heated to its melting point to prepare a dispersion of particles having a particle diameter of not more than 1 $\mu$m. The particulate releaser resin may be added to the solvent at once together with other particulate resin components or batchwise by stage.

Examples of the coloring agent to be incorporated in the toner of the present invention include various pigments such as carbon black, chrome yellow, Hansa yellow, benzidine yellow, threne yellow, quinoline yellow, permanent orange GTR, pyrazolone orange, vulcan orange, watchung red, permanent red, brilliant carmine 3B, brilliant carmine 6B, Du Pont oil red, pyrazolone red, lithol red, rhodamine B lake, lake red C, rose bengal, aniline blue, ultramarine blue, chalco oil blue, methylene blue chloride, phthalocyanine blue, phthalocyanine green and malachite green oxalate, and various dyes such as acridine dye, xanthene dye, azo dye, benzoquinone dye, azine dye, anthraquinone dye, thioindigo dye, dioxazine dye, thiazine dye, azomethine dye, phthalocyanine dye, aniline black dye, polymethine dye, triphenylmethane dye, diphenylmethane dye, thiazine dye, thiazole dye and xanthene dye. These coloring agents may be used singly or in combination.

The method for dispersing these coloring agents is not specifically limited. As the method for dispersing these coloring agents there may be used any dispersion method as using rotary shearing type homogenizer or ball mill, sand mill or dynomill having a medium.

The foregoing particulate coloring agent may be added to the solvent at once together with other particulate components or batchwise by stage.

If the toner of the present invention is used as a magnetic toner, it may comprise a magnetic powder incorporated therein.

Examples of the magnetic powder employable herein include metal such as ferrite, magnetite, reduced iron, cobalt, nickel and manganese, alloy thereof, and compounds of these metals. The toner of the present invention may further comprise commonly used various electrostatic controllers such as quaternary ammonium salt, nigrosine-based compound and triphenylmethane pigment incorporated therein as necessary.

The toner of the present invention may further comprise conventional external additives for toner incorporated therein. In some detail, a particulate inorganic material such as silica, alumina, titania, calcium carbonate, magnesium carbonate and tricalcium phosphate may be used in the form of dispersion with an ionic surface active agent, a high molecular acid or a high molecular base.

The dispersion of the foregoing magnetic powder, electrostatic controller and other external additives can be accomplished in the same manner as the foregoing coloring agent.

The foregoing particulate resin, coloring agent and other components may then be mixed in a solvent to prepare a uniform dispersion of mixed particles to which a metal salt soluble in the dispersion medium is then added with stirring to obtain desired agglomerated particles. During this procedure, the particulate resin, coloring agent and optionally the foregoing inorganic particles may be added at once. Alternatively, the particulate components may be added batchwise by stage to form agglomerated particles having a core-shell structure or a structure having a composition gradient. In this case, a particulate resin dispersion, a particulate coloring agent dispersion, a particulate releaser resin dispersion, and other components may be mixed to form a dispersion in which agglomerated particles are then allowed to grow to a predetermined level of particle diameter. If necessary, the particulate resin dispersion may be additionally added so that the particulate resin is additionally attached to the surface of the agglomerated particles. By allowing the particulate resin thus added to cover the surface of the agglomerated particles, the coloring agent, releaser, etc. can be prevented from being exposed at the surface of the toner particles, making it possible to effectively inhibit possible poor charging and nonuniform charging.

The agglomerated particles having the desired particle diameter thus obtained may be heated to a temperature of not lower than the glass transition point of the resin so that the agglomerated particles are fused to obtain the desired particulate toner. By properly selecting the heat fusion conditions, the shape of the toner particles can be controlled to a range of from amorphous to sphere. When the agglomerated particles are fused at an elevated temperature for a prolonged period of time, the resulting toner particles have a shape closer to sphere.

Further, the fusion at an elevated temperature or in a high concentration may be accompanied by any stabilization process such as one involving the addition of a surface active agent having the same electric charge as the particulate resin used in agglomeration, a high molecular protective colloid or the like to prevent the fusion of agglomerated particles and hence maintain a sharp particle size distribution. In this case, unlike the surface active agent having an electric charge opposite to one added at the agglomeration process, the stabilizing surface active agent is attached to the surface of agglomerated particles, causing the remaining of surface active agents.

Thus, in accordance with the most preferred embodiment of the present invention, if as the solvent for the agglomeration process there is used, e.g., if the particulate resin obtained by emulsion polymerization process and the coloring agent are dispersed in water to form agglomerated particles which are then fused, the adjustment of the pH value of the disoersion system to a range of from 2.0 to 14 for controlling the electric attraction and repulsion of particles makes it possible to stop the progress of agglomeration and hence stabilize the dispersion system. In general, if the surface potential is cationic, the pH value of the dispersion system should be as low as possible for stabilization. On the contrary, if the surface potential is anionic, the pH value of the dispersion system should be as high as possible for stabilization. However, the pH value of the dispersion system deviates from the above defined range, it can cause troubles from the standpoint of stability of particulate resin or other components to chemical decomposition such as hydrolysis. Further, excessive stabilization is disadvantageous because it leads to the destruction of agglomerated particles themselves.

The particles thus fused may be then subjected to solid-solution separation process such as filtration and optionally to washing process and drying process to produce a particulate toner. The particulate toner thus obtained is preferably washed to assure that it has sufficient chargeability and reliability. In particular, if a particulate resin obtained by emulsion polymerization and other components are used and solvent is used as a solvent, the particulate toner is preferably washed with an aqueous alkali having a pH value of not less than 7 and then with an acidic washing water having a pH value of not more than 6.

The drying of the particulate toner can be accomplished by any drying method such as ordinary vibration type fluidized drying method, spray drying method, freeze drying method and flash jet process. The water content of the particulate toner thus dried is preferably adjusted to not more than 1.0%, more preferably not more than 0.5%.

The particulate toner thus dried has a volume-average particle diameter of from 1 to 10 μm, preferably from 3 to 8 μm. If the particle diameter of the particulate toner falls below 1 μm, the resulting toner exhibits an insufficient chargeability resulting in the deterioration of developability. On the contrary, if the particle diameter of the particulate toner exceeds 10 μm, the resulting image has a deteriorated resolution.

Further, the toner of the present invention has an absolute chargeability of from 10 to 40 μC/g, preferably from 15 to 35 μC/g. If the chargeability falls below 10 μC/g, it can cause stain on the background (fog). On the contrary, if the chargeability exceeds 40 μC/g, it can reduce the image density. Moreover, the environmental dependence index represented by the ratio of chargeability of the electrostatic image developing toner in summer (high temperature and high humidity: 28° C., 85% RH) to that in winter (low temperature and low humidity: 10° C. 30% RH) (chargeability at high temperature and high humidity/chargeability at low temperature and low humidity) is preferably from 0.2 to 1.3, more preferably from 0.7 to 1.0. If this ratio deviates from the above defined range, it can impair the charging stability and reliability under high temperature and high humidity conditions.

Further, the toner of the present invention may comprise various external additives incorporated therein similarly to the conventional knead-ground type toners so that it is used as a developer. As such external additives there may be used particulate inorganic materials such as silica, alumina, titania, calcium carbonate, magnesium and tricalcium phosphate. As fluidization aids or cleaning aids there may be used particulate inorganic materials such as silica, alumina, titania and calcium carbonate or particulate resins such as vinyl resin, polyester and silicone. These materials may be given a shearing force in dried form before being added to the particulate toner. Detailed embodiments of the present invention will be described hereinafter in the following examples.

EXAMPLE

Particulate resin dispersions (1) to (4), coloring agent dispersions (1) to (4) and a releaser dispersion (1) were previously prepared in the following manner.

Particulate resin dispersion (1)

| | |
|---|---|
| Styrene | 370 parts by weight |
| n-Butyl acrylate | 30 parts by weight |
| Acrylic acid | 6 parts by weight |
| Dodecanethiol | 24 parts by weight |
| Carbon tetrabromide | 4 parts by weight |

A solution obtained by mixing these components and a solution obtained by dissolving 6 g of a nonionic surface active agent (Nonipole 400, produced by SANYO CHEMICAL INDUSTRIES, LTD.) and 10 g of an anionic surface active agent (Neogen R, produced by DAIICHI PHARMACEUTICAL CO. LTD.) in 550 g of ion-exchanged water were charged into a flask where they were then subjected to dispersion and emulsion. 50 g of ion-exchanged water having 4 g of ammonium persulfate dissolved therein was then added to the emulsion with slow stirring in 10 minutes. Thereafter, the air in the flask was thoroughly replaced by nitrogen. The emulsion system was then heated to 70° C. over an oil bath with stirring. Under these conditions, emulsion polymerization continued for 5 hours.

The latex thus obtained was then measured for volume-average particle diameter ($D_{50}$) of particulate resin by means of a laser diffraction type particle diameter distribution measuring instrument (LA-700, produced by HORIBA, Ltd.). The results were 155 nm. The latex was also measured for glass transition point of resin at a temperature rising rate of 10° C./min by means of a differential scanning calorimeter (DSC-50, produced by Shimadzu Corp.). The results were 59° C. The latex was further measured for weight-average molecular weight (polystyrene equivalence) with THF as a solvent by means of a molecular weight meter (HLC-8020, produced by TOSOH CORP.). The results were 13,000.

Particulate resin dispersion (2)

| | |
|---|---|
| Styrene | 280 parts by weight |
| n-Butyl acrylate | 120 parts by weight |
| Acrylic acid | 8 parts by weight |

A solution obtained by mixing these components and a solution obtained by dissolving 6 g of a nonionic surface active agent (Nonipole 400, produced by SANYO CHEMICAL INDUSTRIES, LTD.) and 12 g of an anionic surface active agent (Neogen R, produced by DAIICHI PHARMACEUTICAL CO. LTD.) in 550 g of ion-exchanged water were charged into a flask where they were then subjected to dispersion and emulsion. 50 g of ion-exchanged water having 3 g of ammonium persulfate dissolved therein was then added to the emulsion with slow stirring in 10 minutes. Thereafter, the air in the flask was thoroughly replaced by nitrogen. The emulsion system was then heated to 70° C. over an oil bath with stirring. Under these conditions, emulsion polymerization continued for 5 hours.

The latex thus obtained was then measured for various properties in the same manner as the particulate resin dispersion (1). As a result, the latex exhibited a volume-average particle diameter of 105 nm, a glass transition point of 53° C. and a weight-average molecular weight of 550,000.

Particulate resin dispersion (3)

| | |
|---|---|
| Styrene | 370 parts by weight |
| n-Butyl acrylate | 30 parts by weight |
| Acrylic acid | 3 parts by weight |
| Dodecanethiol | 24 parts by weight |
| Carbon tetrabromide | 4 parts by weight |

A solution obtained by mixing these components and a solution obtained by dissolving 6 g of a nonionic surface active agent (Nonipole 400, produced by SANYO CHEMICAL INDUSTRIES, LTD.) and 10 g of an anionic surface active agent (Neogen R, produced by DAITCHI PHARMACEUTICAL CO. LTD.) in 550 g of ion-exchanged water were charged into a flash where they were then subjected to dispersion and emulsion. 50 g of ion-exchanged water having 4 g of ammonium persulfate dissolved therein was then added to the emulsion with slow stirring in 10 minutes. Thereafter, the air in the flask was thoroughly replaced by nitrogen. The emulsion system was then heated to 70° C. over an oil bath with stirring. Under these conditions, emulsion polymerization continued for 5 hours.

The latex thus obtained was then measured for various properties in the same manner as the particulate resin dispersion (1). As a result, the latex exhibited a volume-average particle diameter of 162 nm, a glass transition point of 59° C. and a weight-average molecular weight of 135,000.

Particulate resin dispersion (4)

| | |
|---|---|
| Styrene | 370 parts by weight |
| n-Butyl acrylate | 30 parts by weight |
| Acrylic acid | 12 parts by weight |
| Dodecanethiol | 24 parts by weight |
| Carbon tetrabromide | 4 parts by weight |

A solution obtained by mixing these components and a solution obtained by dissolving 6 g of a nonionic surface active agent (Nonipole 400, produced by SANYO CHEMICAL INDUSTRIES, LTD.) and 10 g of an anionic surface active agent (Neogen R, produced by DAIICHI PHARMACEUTICAL CO. LTD.) in 550 g of ion-exchanged water were charged into a flask where they were then subjected to dispersion and emulsion. 50 g of ion-exchanged water having 4 g of ammonium persulfate dissolved therein was then added to the emulsion with slow stirring in 10 minutes. Thereafter, the air in the flask was thoroughly replaced by nitrogen. The emulsion system was then heated to 70° C. over an oil bath with stirring. Under these conditions, emulsion polymerization continued for 5 hours.

The latex thus obtained was then measured for various properties in the same manner as the particulate resin dispersion (1). As a result, the latex exhibited a volume-average particle diameter of 164 nm, a glass transition point of 60° C. and a weight-average molecular weight of 129,000.

Coloring agent dispersion (1)

| | |
|---|---|
| Carbon black (Morgal L, produced by Cabot Corp.) | 50 parts by weight |
| Nonionic surface active agent (Nonipole 400, produced by SANYO CHEMICAL INDUSTRIES, LTD.) | 5 parts by weight |
| Ion-exchanged water | 200 parts by weight |

These components were subjected to dispersion by means of a homogenizer (Ultratalax T50, produced by LKA Corp.) for 10 minutes to obtain a dispersion of carbon black having a volume-average particle diameter ($D_{50}$) of 250 nm.

Coloring agent dispersion (2)

| | |
|---|---|
| Phthalocyanine pigment (PB FAST BLUE 9, produced by BASF Corp.) | 50 parts by weight |
| Anionic surface active agent (Neogen R, produced by DAIICHI PHARMACEUTICAL CO. LTD.) | 5 parts by weight |
| Ion-exchanged water | 200 parts by weight |

These components were subjected to dispersion by means of a homogenizer (Ultratalax T50, produced by LKA Corp.) for 10 minutes and dispersion by an ultrasonic homogenizer to obtain a dispersion of a blue pigment having a volume-average particle diameter ($D_{50}$) of 150 nm similarly to the coloring agent dispersion (1).

Coloring agent dispersion (3)

| | |
|---|---|
| Yellow pigment (Yellow 80, produced by Hoechst Corp.) | 50 parts by weight |
| Anionic surface active agent (Neogen R, produced by DAIICHI PHARMACEUTICAL CO. LTD.) | 5 parts by weight |
| Ion-exchanged water | 200 parts by weight |

These components were subjected to dispersion by means of a homogenizer (Ultratalax T50, produced by LKA Corp.) for 10 minutes and dispersion by an ultrasonic homogenizer to obtain a dispersion of a yellow pigment having a volume-average particle diameter ($D_{50}$) of 150 nm similarly to the coloring agent dispersion (1).

Coloring agent dispersion (4)

| | |
|---|---|
| Red pigment (PR122, produced by DAINICHISEIKA COLOUR & CHEMICALS MFG. CO., LTD.) | 50 parts by weight |
| Anionic surface active agent (Neogen R, produced by DAIICHI PHARMACEUTICAL CO. LTD.) | 5 parts by weight |
| Ion-exchanged water | 200 parts by weight |

These components were subjected to dispersion by means of a homogenizer (Ultratalax T50, produced by LKA Corp.) for 10 minutes and dispersion by an ultrasonic homogenizer to obtain a dispersion of a red pigment having a volume-average particle diameter ($D_{50}$) of 250 nm similarly to the coloring agent dispersion (1).

Particulate releaser dispersion (1)

| | |
|---|---|
| Paraffin wax (HNP0190, produced by Nippon Seiro Co., Ltd.; m.p.: 85° C.) | 50 parts by weight |

-continued

| | |
|---|---|
| Cationic surface active agent (Sanizole B50, produced by Kao Corp.) | 5 parts by weight |
| Ion-exchanged water | 200 parts by weight |

These components were thoroughly subjected to dispersion by means of a homogenizer (Ultratalax T50, produced by LKA Corp.) while being heated to a temperature of 95° C., and then transferred to a pressure-injecting type homogenizer where they were then subjected to dispersion to obtain a dispersion of particulate releaser having a volume-average particle diameter ($D_{50}$) of 550 nm.

COMPARATIVE EXAMPLE 1

| | |
|---|---|
| Particulate resin dispersion (1) | 120 parts by weight |
| Particulate resin dispersion (2) | 80 parts by weight |
| Coloring agent dispersion (1) | 30 parts by weight |
| Releaser dispersion (1) | 40 parts by weight |
| Cationic surface active agent (Sanizole B50, produced by Kao Corp.) | 1.5 parts by weight |

These components were thoroughly subjected to mixing and dispersion in a round stainless steel flask by means of a homogenizer (Ultratalax T50, produced by LKA Corp.), and then heated to a temperature of 48° C. with stirring over a heating oil bath. The dispersion was then kept at the same temperature for 30 minutes. The temperature of the heating oil bath was then raised to 50° C. where the dispersion was then kept for 1 hour to obtain agglomerated particles.

The agglomerated particles thus obtained were then measured for volume-average particle diameter ($D_{50}$) by means of a coal tar counter (TAII, Nikkaki K.K.). The results were 6.0 $\mu$m. Referring to volume-average particle diameter ($D_{50}$) and volume-average particle size distribution (GSVd), cumulative distribution is drawn by plotting particle diameter versus particle range (channel) obtained by dividing measured particle size distribution beginning with small particle diameter value. Supposing that the particle diameter at which cumulative volume 16% is reached is volume-average particle diameter $D_{16}$, the particle diameter at which cumulative volume 50% is reached is volume-average particle diameter $DL_{50}$ and the particle diameter at which cumulative volume 84% is reached is volume-average particle diameter $D_{84}$, the ratio of volume-average particle diameter $D_{84}/D_{16}$ is defined as volume-average particle size distribution coefficient GSVd.

To the dispersion of agglomerated particles was then added 3 g of anionic surface active agent (Neogen R, produced by DAIICHI PHARMACEUTICAL CO. LTD.) to stop the agglomeration of particles so that the agglomerated particles were stabilized. The stainless steel flask was then sealed. Using a magnetic seal, the dispersion was heated to a temperature of 97° C. with continuous stirring. The dispersion was then kept at the same temperature for 3 hours so that the agglomerated particles were fused. The particles thus fused were then measured for volume-average particle diameter ($D_{50}$) by means of a coal tar counter (TAII, produced by Nikkaki K.K.). The results were 6.1 $\mu$m. The volume-average particle size distribution coefficient (GSVd) was 1.25.

The fused particles were cooled, filtered, thoroughly washed with ion-exchanged water having a pH value of 6.5, and then dried by a freeze dryer to obtain a particulate toner. The particulate toner thus obtained was then measured for water content by means of a moisture meter (MA30, produced by Sartorius K.K.). The results were 0.55%. The particulate toner was then measured for volume-average particle diameter ($D_{50}$) by means of coal tar counter (TAII, produced by Nikkaki K.K.). The results were 6.1 $\mu$m. The volume-average particle size distribution coefficient (GSVd) was 1.25. The particulate toner was then measured for acid value by KOH titration method. The results were 11.5 mgKOH/g.

The particulate toner was then observed for surface conditions by an electron microscope. As a result, resin particles were observed fused to the surface of the particles to form a continuous layer. A section of the particulate toner was then observed by a transmission type electron microscope. As a result, little or no pigment was observed exposed at the surface layer. Using a LUZEX image analyzer (LUZEX III, produced by Nicore K.K.), 100 toner particles were measured for peripheral length (ML) and projected area (A). $(ML^2/A)\times(\frac{1}{4}\pi)\times100$ was then calculated. The average of shape factor SF was then determined. The results were 125.

The foregoing particulate toner was allowed to stand free of additives for 12 hours each under high temperature and high humidity conditions (28° C., 85% RH) and under low temperature and low humidity conditions (10° C., 30% RH), and then measured for chargeability ($\mu$C/g). As a result, the particulate toner exhibited a chargeability (Q/M) as low as −1.0 $\mu$C/g under high temperature and high humidity conditions and −12.0 $\mu$C/g under low temperature and low humidity conditions. The particulate toner also exhibited an environmental dependence index (Q/M at 28° C., 85% RH/(Q/M at 10° C., 30% RH) as low as 0.08, demonstrating that it leaves something to be desired in resistance to environmental dependence.

The particulate toner was then measured for content of surface active agent in the following manner.

1 g of the particulate toner was put in 6 g of acetone so that the binder resin component in the toner was dissolved. Thus, the surface active in the surface layer and the core of the toner was extracted with acetone. To 50 g of the acetone solution was then added ion-exchanged water to cause the binder resin to be precipitated again. The insoluble matters such as binder resin component and pigment particles were then removed by filtration. Acetone was then removed from the filtrate containing acetone and ion-exchange water by an evaporator. To the filtrate was then added ethanol to prepare a 95% ethanol solution.

Thereafter, the ethanol solution was sequentially trapped by a cation-exchange material and an anion-exchange material. These ion-exchange materials were each washed away with a 2N HCl solution. The anion was colored by bromocresol green quinine method, and then quantitatively determined at an absorbance of 610 nm. The cation was colored by ethyl violet method, and then quantitatively determined at an absorbance of 611 nm. Further, the 95% ethanol solution which had been sequentially passed through these ion-exchange materials was colored by tetrathiocyanocobaltic acid method, and then quantitatively determined for nonionic surface active agent at an absorbance of 322 nm.

The sum of the amount of anionic surface active agent, cationic surface active agent and nonionic surface active agent thus determined was defined as content of surface active agent in the toner. The foregoing particulate toner showed a surface active agent content of 5.1% by weight.

100 g of the particulate toner was then added 0.43 g of a hydrophobic silica (TS720, produced by Cabot Corp.) with stirring by a sample mill. The foregoing external toner was then measured out in an amount such that the toner concentration was 5% based on the weight of a ferrite carrier having an average particle diameter of 50 μm coated by a methacrylate (produced by Soken Chemical & Engineering Co., Ltd.) in a proportion of 1%. The mixture was then stirred in a ball mill for 5 minutes to prepare a developer. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, remarkable fog occurred, scattering of toner was observed, and a remarkable deterioration of image quality was recognized under both the two conditions. The fixability of the toner was then evaluated. As a result, the toner exhibited a good fixability at a temperature of 130° C. but showed offset at a temperature of 160° C.

EXAMPLE 1

The particulate resin dispersion (1), particulate resin dispersion (2), coloring agent dispersion (1) and releaser dispersion (1) were agglomerated with 3 g of zinc chloride instead of the cationic surface active agent (Sanizole B50, produced by Kao Corp.) as a flocculent in the same manner as in Comparative Example 1. These components were thoroughly subjected to mixing and dispersion in a round stainless steel flask by means of a homogenizer (Ultratalax T50, produced by LKA Corp.), and then heated to a temperature of 48° C. with stirring over a heating oil bath. The dispersion was then kept at the same temperature for 30 minutes. Thereafter, to the dispersion was then added slowly 60 g of the particulate resin dispersion (1). The temperature of the heating oil bath was then raised to 50° C. where the dispersion was then kept for 1 hour to obtain agglomerated particles.

The agglomerated particles thus obtained were then measured for volume-average particle diameter ($D_{50}$) by means of a coal tar counter (TAII, Nikkaki K.K.). The results were 6.0 μm. The volume-average particle size distribution coefficient (GSVd) was 1.25.

To the dispersion of agglomerated particles was then added 3 g of an anionic surface active agent (Neogen R, produced by DAIICHI PHARMACEUTICAL CO. LTD.) to stop the agglomeration of particles so that the agglomerated particles were stabilized. The stainless steel flask was then sealed. Using a magnetic seal, the dispersion was heated to a temperature of 97° C. with continuous stirring. The dispersion was then kept at the same temperature for 3 hours so that the agglomerated particles were fused. The particles thus fused were then measured for volume-average particle diameter ($D_{50}$) by means of a coal tar counter (TAII, produced by Nikkaki K.K.). The results were 6.0 μm. The volume-average particle size distribution coefficient (GSVd) was 1.25.

The fused particles were thoroughly washed with ion-exchanged water having a pH value of 6.5, and then freeze-dried to obtain a particulate toner. The particulate toner thus obtained was then measured for water content. The results were 0.50%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using a LUZEX image analyzer, the particulate toner was then measured for shape factor SF in the same manner as in Comparative Example 1. The results were 125.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −18.0 μC/g under high temperature and high humidity conditions and −24.0 μC/g under low temperature and low humidity conditions. The particulate toner also exhibited an environmental dependence index (Q/M at 28° C., 85% RH/(Q/M at 10° C., 30% RH) as high as 0.75, demonstrating that it exhibits an excellent resistance to environmental dependence.

The foregoing particulate toner was then quantitatively determined for content of surface active agents remaining therein in the same manner as in Comparative Example 1. The results were 1.0% by weight (Since no cationic surface active agents were used in the present example, the content of cation-exchange material was zero). The residue after heat decomposition of 0.5 g of the particulate toner at 550° C. was dissolved in a 60% nitric acid solution. To the solution was then added ion-exchanged water to make 25 ml. Thereafter, the sample solution was quantitatively determined for amount of residual zinc from the flocculant by inductively coupled plasma spectrometry (ICP). The results were 0.5% by weight. The particulate toner was then measured for acid value by KOH titration method. The results were 10.9 mgKOH/g.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability.

EXAMPLE 2

The particulate resin dispersion (1), particulate resin dispersion (2), coloring agent dispersion (1) and releaser dispersion (1) were agglomerated with zinc chloride as a flocculent at a temperature of 50° C. for 1 hour in the same manner as in Example 1. The dispersion of agglomerated particles thus obtained was then measured for pH at 50° C. The results were 3.5. To the dispersion was then added a 1N aqueous solution of NaOH so that it exhibited a pH value of 6 at 50° C. to stabilize the agglomerated particles. Thereafter, the agglomerated particles were fused in the same manner as in Comparative Example 1 to obtain fused particles. The particles thus fused were then measured for volume-average particle diameter ($D_{50}$) by means of the same coal tar counter as used above. The results were 6.0 μm. The volume-average particle size distribution coefficient (GSVd) was 1.25.

The fused particles were thoroughly washed with ion-exchanged water having a pH value of 6.5, and then freeze-dried to obtain a particulate toner. The particulate toner thus obtained was then measured for water content. The results were 0.51%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using the same LUZEX image analyzer as used above, the particulate toner was then measured for shape factor SF in the same manner as in Comparative Example 1. The results were 124. The particulate toner was then measured for acid value by KOH titration method. The results were 10.4 mgKOH/g.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −22.0 μC/g under high temperature and high humidity conditions and −28.0 μC/g under low temperature and low humidity conditions. The particulate toner also exhibited an environmental dependence index as high as 0.79, demonstrating that it exhibits an excellent resistance to environmental dependence. The particulate toner was then quantitatively determined for content of surface active agents remaining therein in the same manner as in Example 1. The results were 0.5% by weight. The particulate toner also exhibited a flocculent metal salt (zinc salt) content of 0.3% by weight.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability.

EXAMPLE 6

The particulate resin dispersion (1), particulate resin dispersion (2), coloring agent dispersion (1) and releaser dispersion (1) were agglomerated with 3 g of ferric chloride instead of zinc chloride as a flocculant at a temperature of 50° C. for 1 hour in the same manner as in Example 1. The dispersion of agglomerated particles thus obtained was then measured for pH at 50° C. The results were 3.5. To the dispersion was then added a 1N aqueous solution of NaOH so that it exhibited a pH value of 10 at 50° C. to stabilize the agglomerated particles. Thereafter, the agglomerated particles were fused in the same manner as in Comparative Example 1 to obtain fused particles. The particles thus fused were then measured for volume-average particle diameter ($D_{50}$) by means of the same coal tar counter as used above. The results were 6.0 μm. The volume-average particle size distribution coefficient (GSVd) was 1.23.

The fused particles were thoroughly washed with an aqueous NaOH alkaline solution having a pH value of 10, with a nitrically acidic solution having a pH value of 3 and then with ion-exchanged water having a pH value of 6.5, and then freeze-dried to obtain a particulate toner. The particulate toner thus obtained was then measured for water content. The results were 0.48%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using the same LUZEX image analyzer as used above, the particulate toner was then measured for shape factor SF in the same manner as in Comparative Example 1. The results were 125. The particulate toner was then measured for acid value by KOH titration method. The results were 11.5 mgKOH/g. The particulate toner was then quantitatively determined for content of surface active agents remaining therein in the same manner as in Example 1. The results were 0.2% by weight. The particulate toner also exhibited a flocculant metal salt content of 120 ppm.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −25.0 μC/g under high temperature and high humidity conditions and −28.0 μC/g under low temperature and low humidity conditions. The particulate toner also exhibited an environmental dependence index as high as 0.89, demonstrating that it exhibits an excellent resistance to environmental dependence.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability.

EXAMPLE 7

The particulate resin dispersion (1), particulate resin dispersion (2), coloring agent dispersion (1) and releaser dispersion (1) were agglomerated with 1 g of aluminum sulfate instead of zinc chloride as a flocculent at a temperature of 50° C. for 1 hour in the same manner as in Example 1. The dispersion of agglomerated particles thus obtained was then measured for pH at 50° C. The results were 3.5. To the dispersion was then added a 1N aqueous solution of NaOH so that it exhibited a pH value of 10 at 50° C. to stabilize the agglomerated particles. Thereafter, the agglomerated particles were fused in the same manner as in Comparative Example 1 to obtain fused particles. The particles thus fused were then measured for volume-average particle diameter ($D_{50}$) by means of the same coal tar counter as used above. The results were 6.0 μm. The volume-average particle size distribution coefficient (GSVd) was 1.24.

The fused particles were thoroughly washed with an aqueous NaOH alkaline solution having a pH value of 10, with a nitrically acidic solution having a pH value of 3 and then with ion-exchanged water having a pH value of 6.5, and then freeze-dried to obtain a particulate toner. The particulate toner thus obtained was then measured for water content. The results were 0.40%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electronmicroscope. As a result, little or no pigment was observed exposed at the surface layer. Using the same LUZEX image analyzer as used above, the particulate toner was then measured for shape factor SF in the same manner as in Comparative Example 1. The results were 125. The particulate toner was then measured for acid value by KOH titration method. The results were 10.1 mgKOH/g. The particulate toner was then quantitatively determined for content of surface active agents remaining therein in the same manner as in Example 1. The results were 0.1% by weight. The particulate toner also exhibited a flocculent metal salt content of 150 ppm.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −25.0 μC/g under high temperature and high humidity conditions and −29.0 μC/g under low temperature and low humidity conditions. The particulate toner also exhibited an environmental dependence index as high as 0.86, demonstrating that it exhibits an excellent resistance to environmental dependence.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability.

EXAMPLE 8

The particulate resin dispersion (1), particulate resin dispersion (2), coloring agent dispersion (1) and releaser dispersion (1) were agglomerated with 0.5 g of polyaluminum hydroxide (Paho2s, produced by Asada Chemical Co., Ltd.) instead of zinc chloride as a flocculent at a temperature of 50° C. for 1 hour in the same manner as in Example 1. The dispersion of agglomerated particles thus obtained was then measured for pH at 50° C. The results were 3.5. To the dispersion was then added a 1N aqueous solution of NaOH so that it exhibited a pH value of 10 at 50° C. to stabilize the agglomerated particles. Thereafter, the agglomerated particles were fused in the same manner as in Comparative Example 1 to obtain fused particles. The particles thus fused were then measured for volume-average particle diameter ($D_{50}$) by means of the same coal tar counter as used above. The results were 6.0 μm. The volume-average particle size distribution coefficient (GSVd) was 1.20.

The fused particles were thoroughly washed with an aqueous NaOH alkaline solution having a pH value of 10, with a nitrically acidic solution having a pH value of 3 and then with ion-exchanged water having a pH value of 6.5, and then freeze-dried to obtain a particulate toner. The particulate toner thus obtained was then measured for water content. The results were 0.49%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electronmicroscope. As a result, little or no pigment was observed exposed at the surface layer. Using the same LUZEX image analyzer as used above, the particulate toner was then measured for shape factor SF in the same manner as in Comparative Example 1. The results were 125. The particulate toner was then measured for acid value by KOH titration method. The results were 9.5 mgKOH/g. The particulate toner was then quantitatively determined for content of surface active agents remaining therein in the same manner as in Example 1. The results were 0.2% by weight. The particulate toner also exhibited a flocculent metal salt content of 80 ppm.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −25.0 μC/g under high temperature and high humidity conditions and −29.0 μC/g under low temperature and low humidity conditions. The particulate toner also exhibited an environmental dependence index as high as 0.86, demonstrating that it exhibits an excellent resistance to environmental dependence.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability.

EXAMPLE 10

The particulate resin dispersion (1), particulate resin dispersion (2), coloring agent dispersion (1) and releaser dispersion (1) were agglomerated with 1 g of polyaluminum chloride as a flocculent at a temperature of 50° C. for 1 hour in the same manner as in Example 1. The dispersion of agglomerated particles thus obtained was then measured for pH at 50° C. The results were 3.5. To the dispersion was then added a IN aqueous solution of NaOH so that it exhibited a pH value of 10 at 50° C. to stabilize the agglomerated particles. Thereafter, the agglomerated particles were heated to a temperature of 97° C. in the same manner as in Example 1 except that the heating time was changed from 6 hours to 8 hours to obtain fused particles. The particles thus fused were then measured for volume-average particle diameter ($D_{50}$) by means of the same coal tar counter as used above. The results were 6.0 $\mu$m. The volume-average particle size distribution coefficient (GSVd) was 1.20.

The fused particles were thoroughly washed with an aqueous NaOH alkaline solution having a pH value of 10, with a nitrically acidic solution having a pH value of 3 and then with ion-exchanged water having a pH value of 6.5, and then freeze-dried to obtain a particulate toner. The particulate toner thus obtained was then measured for water content. The results were 0.50%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using the same LUZEX image analyzer as used above, the particulate toner was then measured for shape factor SF in the same manner as in Comparative Example 1. The results were 115. The particulate toner was then measured for acid value by KOH titration method. The results were 10.0 mgKOH/g. The particulate toner was then quantitatively determined for content of surface active agents remaining therein in the same manner as in Example 1. The results were 0.2% by weight. The particulate toner also exhibited a flocculent metal salt content of 60 ppm.

The foregoing particulate toner was allowed to stand free of additives for 12 hours each under high temperature and high humidity conditions (28° C., 85% RH) and under low temperature and low humidity conditions (10° C., 30% RH), and then measured for chargeability ($\mu$C/g). As a result, the particulate toner exhibited a chargeability (Q/M) as good as −24.0 $\mu$C/g under high temperature and high humidity conditions and −26.0 $\mu$C/g under low temperature and low humidity conditions. The particulate toner also exhibited an environmental dependence index as high as 0.92, demonstrating that it exhibits an excellent resistance to environmental dependence.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost goodimage forming properties. The fixability of the toner was then evaluated. As a result, the toner exhibited a good fixability at a temperature of 130° C. and showed no offset at a temperature of 230° C., demonstrating that the developer exhibits a good fixability.

EXAMPLE 11

The particulate resin dispersion (1), particulate resin dispersion (2), coloring agent dispersion (1) and releaser dispersion (1) were agglomerated with 1 g of polyaluminum chloride as a flocculent at a temperature of 50° C. for 1 hour in the same manner as in Example 1. The dispersion of agglomerated particles thus obtained was then measured for pH at 50° C. The results were 3.5. To the dispersion was then added a 1N aqueous solution of NaOH so that it exhibited a pH value of 10 at 50° C. to stabilize the agglomerated particles. Thereafter, the agglomerated particles were heated to a temperature of 95° C. instead of 97° C. for 6 hours to obtain fused particles. The particles thus fused were then measured for volume-average particle diameter ($D_{50}$) by means of the same coal tar counter as used above. The results were 6.0 $\mu$m. The volume-average particle size distribution coefficient (GSVd) was 1.20.

The fused particles were thoroughly washed with an aqueous NaOH alkaline solution having a pH value of 10, with a nitrically acidic solution having a pH value of 3 and then with ion-exchanged water having a pH value of 6.5, and then freeze-dried to obtain a particulate toner. The particulate toner thus obtained was then measured for water content. The results were 0.49%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using the same LUZEX image analyzer as used above, the particulate toner was then measured for shape factor SF in the same manner as in Comparative Example 1. The results were 135. The particulate toner was then measured for acid value by KOH titration method. The results were 10.1 mgKOH/g. The particulate toner was then quantitatively determined for content of surface active agents remaining therein in the same manner as in Example 1. The results were 0.2% by weight. The particulate toner also exhibited a flocculant metal salt content of 70 ppm.

The foregoing particulate toner was allowed to stand free of additives for 12 hours each under high temperature and high humidity conditions (28° C., 85% RH) and under low temperature and low humidity conditions (10° C., 30% RH), and then measured for chargeability ($\mu$C/g). As a result, the particulate toner exhibited a chargeability (Q/M) as good as −27.0 $\mu$C/g under high temperature and high humidity conditions and −30.0 $\mu$C/g under low temperature and low humidity conditions. The particulate toner also exhibited an environmental dependence index as high as 0.90, demonstrating that it exhibits an excellent resistance to environmental dependence.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability.

EXAMPLE 12

The particulate resin dispersion (3), particulate resin dispersion (2), coloring agent dispersion (1) and releaser dispersion (1) were agglomerated with 1 g of polyaluminum chloride as a flocculent at a temperature of 50° C. for 1 hour in the same manner as in Example 1. The dispersion of agglomerated particles thus obtained was then measured for pH at 50° C. The results were 3.5. To the dispersion was then added a 1N aqueous solution of NaOH so that it exhibited a pH value of 10 at 50° C. to stabilize the agglomerated particles. Thereafter, the agglomerated particles were heated to a temperature of 97° C. for 6 hours to obtain fused particles. The particles thus fused were then measured for volume-average particle diameter ($D_{50}$) by means of the same coal tar counter as used above. The results were 5.9 μm. The volume-average particle size distribution coefficient (GSVd) was 1.20.

The fused particles were thoroughly washed with an aqueous NaOH alkaline solution having a pH value of 10, with a nitrically acidic solution having a pH value of 3 and then with ion-exchanged water having a pH value of 6.5, and then freeze-dried to obtain a particulate toner. The particulate toner thus obtained was then measured for water content. The results were 0.49%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using the same LUZEX image analyzer as used above, the particulate toner was then measured for shape factor SF in the same manner as in Comparative Example 1. The results were 120. The particulate toner was then measured for acid value by KOH titration method. The results were 6.2 mgKOH/g. The particulate toner was then quantitatively determined for content of surface active agents remaining therein in the same manner as in Example 1. The results were 0.3% by weight. The particulate toner also exhibited a flocculant metal salt content of 40 ppm.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −29.0 μC/g under high temperature and high humidity conditions and −35.0 μC/g under low temperature and low humidity conditions. The particulate toner also exhibited an environmental dependence index as high as 0.83, demonstrating that it exhibits an excellent resistance to environmental dependence.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability.

EXAMPLE 13

The particulate resin dispersion (4), particulate resin dispersion (2), coloring agent dispersion (1) and releaser dispersion (1) were agglomerated with 1 g of polyaluminum chloride as a flocculent at a temperature of 50° C. for 1 hour in the same manner as in Example 1. The dispersion of agglomerated particles thus obtained was then measured for pH at 50° C. The results were 3.5. To the dispersion was then added a IN aqueous solution of NaOH so that it exhibited a pH value of 10 at 50° C. to stabilize the agglomerated particles. Thereafter, the agglomerated particles were heated to a temperature of 97° C. for 6 hours to obtain fused particles. The particles thus fused were then measured for volume-average particle diameter ($D_{50}$) by means of the same coal tar counter as used above. The results were 6.0 μm. The volume-average particle size distribution coefficient (GSVd) was 1.20.

The fused particles were thoroughly washed with an aqueous NaOH alkaline solution having a pH value of 10, with a nitrically acidic solution having a pH value of 3 and then with ion-exchanged water having a pH value of 6.5, and then freeze-dried to obtain a particulate toner. The particulate toner thus obtained was then measured for water content. The results were 0.47%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using the same LUZEX image analyzer as used above, the particulate toner was then measured for shape factor SF in the same manner as in Comparative Example 1. The results were 120. The particulate toner was then measured for acid value by KOH titration method. The results were 18 mgKOH/g. The particulate toner was then quantitatively determined for content of surface active agents remaining therein in the same manner as in Example 1. The results were 0.2% by weight. The particulate toner also exhibited a flocculent metal salt content of 80 ppm.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −30.0 μC/g under high temperature and high humidity conditions and −37.0 μC/g under low temperature and low humidity conditions. The particulate toner also exhibited an environmental dependence index as high as 0.81, demonstrating that it exhibits an excellent resistance to environmental dependence.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability.

EXAMPLE 14

Agglomerated particles were produced in the same manner as in Example 9 except that the coloring agent dispersion (2) was used instead of the coloring agent dispersion (1). The agglomerated particles thus produced were then fused in the same manner as in Example 9 to obtain fused particles. The particles thus fused were then measured for volume-average particle diameter ($D_{50}$) by means of the same coal tar counter as used above. The results were 5.9 μm. The volume-average particle size distribution coefficient (GSVd) was 1.20.

The fused particles were thoroughly washed with an aqueous NaOH alkaline solution having a pH value of 10, with a nitrically acidic solution having a pH value of 3 and then with ion-exchanged water having a pH value of 6.5, and then freeze-dried to obtain a particulate toner. The particulate toner thus obtained was then measured for water content. The results were 0.49%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using the same LUZEX image analyzer as used above, the particulate toner was then measured for shape factor SF in the same manner as in Comparative Example 1. The results were 120. The particulate toner was then measured for acid value by KOH titration method. The results were 9.1 mgKOH/g. The particulate toner was then quantitatively determined for content of surface active agents remaining therein in the same manner as in Example 1. The results were 0.1% by weight. The particulate toner also exhibited a flocculent metal salt content of 40 ppm.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −29.0 μC/g under high temperature and high humidity conditions and −35.0 μC/g under low temperature and low humidity conditions. The particulate toner also exhibited an environmental dependence index as high as 0.83, demonstrating that it exhibits an excellent resistance to environmental dependence.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability.

EXAMPLE 15

Agglomerated particles were produced in the same manner as in Example 9 except that the coloring agent dispersion (3) was used instead of the coloring agent dispersion (1). The agglomerated particles thus produced were then fused in the same manner as in Example 9 to obtain fused particles. The particles thus fused were then measured for volume-average particle diameter ($D_{50}$) by means of the same coal tar counter as used above. The results were 5.9 μm. The volume-average particle size distribution coefficient (GSVd) was 1.20.

The fused particles were thoroughly washed with an aqueous NaOH alkaline solution having a pH value of 10, with a nitrically acidic solution having a pH value of 3 and then with ion-exchanged water having a pH value of 6.5, and then freeze-dried to obtain a particulate toner. The particulate toner thus obtained was then measured for water content. The results were 0.49%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using the same LUZEX image analyzer as used above, the particulate toner was then measured for shape factor SF in the same manner as in Comparative Example 1. The results were 120. The particulate toner was then measured for acid value by KOH titration method. The results were 9.5 mgKOH/g. The particulate toner was then quantitatively determined for content of surface active agents remaining therein in the same manner as in Example 1. The results were 0.2% by weight. The particulate toner also exhibited a flocculent metal salt content of 30 ppm.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −29.0 μC/g under high temperature and high humidity conditions and −35.0 μC/g under low temperature and low humidity conditions. The particulate toner also exhibited an environmental dependence index as high as 0.83, demonstrating that it exhibits an excellent resistance to environmental dependence.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability.

EXAMPLE 16

Agglomerated particles were produced in the same manner as in Example 9 except that the coloring agent dispersion (4) was used instead of the coloring agent dispersion (1). The agglomerated particles thus produced were then fused in the same manner as in Example 9 to obtain fused particles. The particles thus fused were then measured for volume-average particle diameter ($D_{50}$) by means of the same coal tar counter as used above. The results were 5.9 μm. The volume-average particle size distribution coefficient (GSVd) was 1.20.

The fused particles were thoroughly washed with an aqueous NaOH alkaline solution having a pH value of 10, with a nitrically acidic solution having a pH value of 3 and then with ion-exchanged water having a pH value of 6.5, and then freeze-dried to obtain a particulate toner. The particulate toner thus obtained was then measured for water content. The results were 0.49%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using the same LUZEX image analyzer as used above, the particulate toner was then measured for shape factor SF in the same manner as in Comparative Example 1. The results were 120. The particulate toner was then measured for acid value by KOH titration method. The results were 9.6 mgKOH/g. The particulate toner was then quantitatively determined for content of surface active agents remaining therein in the same manner as in Example 1. The results were 0.1%. by weight. The particulate toner also exhibited a flocculent metal salt content of 30 ppm.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −29.0 μC/g under high temperature and high humidity conditions and −35.0 μC/g under low temperature and low humidity conditions. The particulate toner also exhibited an environmental dependence index as high as 0.83, demonstrating that it exhibits an excellent resistance to environmental dependence.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability.

TABLE 1

| | Comparative Example 1 | Example 1 | Example 2 |
|---|---|---|---|
| 1) Particulate resin St/BA/AA weight ratio | 92.5/7.5/1.5 | 92.5/7.5/1.5 | 92.5/7.5/1.5 |
| Particle diameter (μm) | 0.155 | 0.155 | 0.155 |
| Weight-average molecular weight | 13,000 | 13,000 | 13,000 |
| Tg (° C.) | 59 | 59 | 59 |

TABLE 1-continued

| | Comparative Example 1 | Example 1 | Example 2 |
|---|---|---|---|
| 2) Particulate resin St/BA/AA weight ratio | 70/30/2 | 70/30/2 | 70/30/2 |
| Particle diameter (μm) | 0.105 | 0.105 | 0.105 |
| Weight-average molecular weight | 550,000 | 550,000 | 550,000 |
| Tg (° C.) | 53 | 53 | 53 |
| 3) Coloring agent | Carbon black | Carbon black | Carbon black |
| Particle diameter (μm) | 0.25 | 0.25 | 0.25 |
| 4) Releaser | HNP0190 | HNP0190 | HNP0190 |
| Particle diameter (μm) | 0.55 | 0.55 | 0.55 |
| 5) Flocculant Sanizole | B50 | $ZnCl_2$ | $ZnCl_2$ |
| Treatment during fusion | Neogen R added | Neogen R added | Adjusted to pH 6 |
| Washing Solution (pH) | Ion-exchanged water | Ion-exchanged water | Ion-exchanged water |
| Toner | | | |
| Particle diameter (μm) | 6.1 | 6.0 | 6.0 |
| GSDv | 1.25 | 1.25 | 1.25 |
| SF | 125 | 125 | 124 |
| Acid value (mgKOH/g) | 11.5 | 10.9 | 10.4 |
| Surface active agent content | 5.1 wt-% | 1.0 wt-% | 0.5 wt-% |
| Metal salt Content | | 0.5 wt-% | 0.4 wt-% |
| Chargeability (μC/g) | | | |
| 23° C., 85% RH | −1 | −18 | −22 |
| 10° C., 30% RH | −12 | −24 | −28 |
| Environmental dependence index | 0.08 | 0.75 | 0.79 |
| Image quality | | | |
| Fog | Observed | None | None |
| Toner scattering | Observed | None | None |
| Fixability Poor | poor | Good | Good |

TABLE 2

| | Example 6 | Example 7 | Example 8 | Example 10 | Example 11 |
|---|---|---|---|---|---|
| 1) Particulate resin St/BA/AA weight ratio | 92.5/7.5/1.5 | 92.5/7.5/1.5 | 92.5/7.5/1.5 | 92.5/7.5/1.5 | 92.5/7.5/1.5 |
| Particle diameter (μm) | 0.155 | 0.155 | 0.155 | 0.155 | 0.155 |
| Weight-average molecular weight | 13,000 | 13,000 | 13,000 | 13,000 | 13,000 |
| Tg (° C.) | 59 | 59 | 59 | 59 | 59 |
| 2) Particulate resin St/BA/AA weight ratio | 70/30/2 | 70/30/2 | 70/30/2 | 70/30/2 | 70/30/2 |
| Particle diameter (μm) | 0.105 | 0.105 | 0.105 | 0.105 | 0.105 |
| Weight-average molecular weight | 550,000 | 550,000 | 550,000 | 550,000 | 550,000 |
| Tg (° C.) | 53 | 53 | 53 | 53 | 53 |
| 3) Coloring agent | Carbon black | Carbon black | Carbon black | Carbon black | Carbon black |
| Particle diameter (μm) | 0.25 | 0.25 | 0.25 | 0.25 | 0.25 |
| 4) Releaser | HNP0190 | HNP0190 | HNP0190 | HNP0190 | HNP0190 |
| Particle diameter (μm) | 0.55 | 0.55 | 0.55 | 0.55 | 0.55 |
| 5) Flocculant | Ferric | Aluminum | Polyaluminum | Polyaluminum | Polyaluminum |

TABLE 2-continued

| | Example 6 | Example 7 | Example 8 | Example 10 | Example 11 |
|---|---|---|---|---|---|
| | chloride | sulfate | hydroxide | chloride | chloride |
| Treatment during fusion | Adjusted to pH 10 | Adjusted to pH 10 | Adjusted to pH 10 | Adjusted to pH 10 | Adjusted to pH 10 |
| Washing Solution (pH) | Alkaline water (10) Acidic water (3) Ion-exchanged Water | Alkaline water (10) Acidic water (3) Ion-exchanged water | Alkaline water (10) Acidic water (3) Ion-exchanged water | Alkaline water (10) Acidic water (3) Ion-exchanged water | Alkaline water (10) Acidic water (3) Ion-exchanged water |
| Toner | | | | | |
| Particle diameter ($\mu$) | 6.0 | 6.0 | 6.0 | 6.1 | 6.1 |
| GSDv | 1.23 | 1.24 | 1.20 | 1.20 | 1.20 |
| SF | 125 | 125 | 125 | 115 | 135 |
| Acid value (mgKOH/g) | 11.5 | 10.1 | 9.5 | 10.0 | 10.1 |
| Surface active agent content | 0.2 wt-% | 0.1 wt-% | 0.2 wt-% | 0.2 wt-% | 0.2 wt-% |
| Metal salt Content | 120 ppm | 150 ppm | 80 ppm | 60 ppm | 70 ppm |
| Chargeability ($\mu$C/g) | | | | | |
| 23° C., 85% RH | −25 | −25 | −25 | −24 | −27 |
| 10° C., 30% RH | −28 | −29 | −29 | −26 | −30 |
| Environmental dependence index | 0.89 | 0.86 | 0.86 | 0.92 | 0.90 |
| Image quality | | | | | |
| Fog | None | None | None | None | None |
| Toner scattering | None | None | None | None | None |
| Fixability | Good | Good | Good | Good | Good |

TABLE 3

| | Example 12 | Example 13 | Example 14 | Example 15 | Example 16 |
|---|---|---|---|---|---|
| 1) Particulate resin St/BA/AA weight ratio | 92.5/7.5/1.5 | 92.5/7.5/1.5 | 92.5/7.5/1.5 | 92.5/7.5/1.5 | 92.5/7.5/1.5 |
| Particle diameter ($\mu$m) | 0.162 | 0.164 | 0.155 | 0.155 | 0.155 |
| Weight-average molecular weight | 13,500 | 12,900 | 13,000 | 13,000 | 13,000 |
| Tg (° C.) | 59 | 59 | 59 | 59 | 59 |
| 2) Particulate resin St/BA/AA weight ratio | 70/30/2 | 70/30/2 | 70/30/2 | 70/30/2 | 70/30/2 |
| Particle diameter ($\mu$m) | 0.105 | 0.105 | 0.105 | 0.105 | 0.105 |
| Weight-average molecular weight | 550,000 | 550,000 | 550,000 | 550,000 | 550,000 |
| Tg (° C.) | 53 | 53 | 53 | 53 | 53 |
| 3) Coloring agent | Carbon black | Carbon black | Blue pigment | Yellow pigment | Red pigment |
| Particle diameter ($\mu$m) | 0.25 | 0.25 | 0.15 | 0.15 | 0.25 |
| 4) Releaser | HNP0190 | HNP0190 | HNP0190 | HNP0190 | HNP0190 |
| Particle diameter ($\mu$m) | 0.55 | 0.55 | 0.55 | 0.55 | 0.55 |
| 5) Flocculant | Polyaluminum chloride | Polyaluminum chloride | Polyaluminum chloride | Polyaluminum chloride | Polyaluminum chloride |
| Treatment during fusion | Adjusted to pH 10 | Adjusted to pH 10 | Adjusted to pH 10 | Adjusted to pH 10 | Adjusted to pH 10 |
| Washing Solution (pH) | Alkaline water (10) Acidic water (3) Ion-Exchanged Water | Alkaline water (10) Acidic water (3) Ion-Exchanged water | Alkaline water (10) Acidic water (3) Ion-Exchanged water | Alkaline water (10) Acidic water (3) Ion-Exchanged water | Alkaline water (10) Acidic water (3) Ion-Exchanged water |
| Toner | | | | | |
| Particle diameter ($\mu$m) | 5.9 | 6.0 | 5.9 | 5.9 | 5.9 |
| GSDv | 1.20 | 1.20 | 1.20 | 1.20 | 1.20 |

TABLE 3-continued

| | Example 12 | Example 13 | Example 14 | Example 15 | Example 16 |
|---|---|---|---|---|---|
| SF | 120 | 120 | 120 | 120 | 120 |
| Acid value (mgKOH/g) | 6.2 | 18.0 | 9.1 | 9.5 | 9.6 |
| Surface active agent content | 0.3 wt-% | 0.2 wt-% | 0.1 wt-% | 0.2 wt-% | 0.1 wt-% |
| Metal salt Content | 40 ppm | 80 ppm | 40 ppm | 30 ppm | 30 ppm |
| Chargeability (μC/g) | | | | | |
| 23° C., 85% RH | −29 | −30 | −29 | −29 | −29 |
| 10° C., 30% RH | −35 | −37 | −35 | −35 | −35 |
| Environmental dependence index | 0.83 | 0.81 | 0.83 | 0.83 | 0.83 |
| Image quality | | | | | |
| Fog | None | None | None | None | None |
| Toner scattering | None | None | None | None | None |
| Fixability | Good | Good | Good | Good | Good |

As mentioned in the comparative examples and examples above, the restriction of the content of surface active agents remaining in the toner, the use of a metal having a valence of two or more as a flocculent and the introduction of ion bond developed by the remaining of the flocculant metal salt in the particulate toner in a predetermined amount bring about excellent chargeability and resistance to environmental dependence, making it possible to provide a particulate toner having excellent image properties. By using an aluminum polymer having a higher charge as the metal salt and properly controlling the pH value of the dispersion medium of the agglomerated particles to stabilize the agglomerated particles before heat fusion, a particulate toner having the best-balanced properties can be obtained.

| | |
|---|---|
| Particulate resin dispersion (1) | 120 parts by weight |
| Particulate resin dispersion (2) | 80 parts by weight |
| Coloring agent dispersion (2) | 30 parts by weight |
| Releaser dispersion (1) | 40 parts by weight |
| Cationic surface active agent (Sanizole B50, produced by Kao Corp.) | 1.5 parts by weight |

These components were thoroughly subjected to mixing and dispersion in a round stainless steel flask by means of a homogenizer (Ultratalax T50, produced by LKA Corp.), and then heated to a temperature of 48° C. with stirring over a heating oil bath. The dispersion was then kept at the same temperature for 30 minutes. The temperature of the heating oil bath was then raised to 50° C. where the dispersion was then kept for 1 hour to obtain agglomerated particles. The agglomerated particles thus obtained were then measured for volume-average particle diameter ($D_{50}$) by means of a coal tar counter (TAII, Nikkaki K.K.). The results were 6.0 μm. The volume-average particle size distribution coefficient (GSDv) was 1.25.

To the dispersion of agglomerated particles was then added 3 g of an anionic surface active agent (Neogen R, produced by DAIICHI PHARMACEUTICAL CO. LTD.) to stop the agglomeration of particles so that the agglomerated particles were stabilized. The stainless steel flask was then sealed. Using a magnetic seal, the dispersion was heated to a temperature of 97° C. with continuous stirring. The dispersion was then kept at the same temperature for 5 hours so that the agglomerated particles were fused. The particles thus fused were then measured for volume-average particle diameter ($D_{50}$) by means of a coal tar counter (TAII, produced by Nikkaki K.K.). The results were 6.1 μm. The volume-average particle size distribution coefficient (GSVd) was 1.25.

The fused particles were cooled, filtered, thoroughly washed with ion-exchanged water having a pH value of 6.5, and then dried by a freeze dryer to obtain a particulate toner. The particulate toner thus obtained was then measured for water content by means of a moisture meter (MA30, produced by Sartorius K.K.). The results were 0.55%. The particulate toner was then measured for volume-average particle diameter ($D_{50}$) by means of coal tar counter (TAII, produced by Nikkaki K.K.). The results were 6.1 μm. The volume-average particle size distribution coefficient (GSVd) was 1.26. The particulate toner was then measured for acid value by KOH titration method. The results were 10.5 mgKOH/g. The average of shape factor SF was 120.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as low as −1.0 μC/g under high temperature and high humidity conditions and −12.0 μC/g under low temperature and low humidity conditions. The particulate toner also exhibited an environmental dependence index (Q/M at 28° C., 85% RH/(Q/M at 10° C., 30% RH) as low as 0.08, demonstrating that it leaves something to be desired in resistance to environmental dependence. The foregoing particulate toner also exhibited a surface active agent content of 5.1% by weight.

100 g of the particulate toner was then added 0.43 g of a hydrophobic silica (TS720, produced by Cabot Corp.) with stirring by a sample mill. The foregoing external toner was then measured out in an amount such that the toner concentration was 5% based on the weight of a ferrite carrier having an average particle diameter of 50 μm coated by a methacrylate (produced by Soken Chemical & Engineering Co., Ltd.) in a proportion of 1%. The mixture was then stirred in a ball mill for 5 minutes to prepare a developer. The developer thus prepared was then subjected to duplication test of 10,000 sheets under high temperature and high humidity conditions (28° C., 85% RH) and under low temperature and low humidity conditions (10° C., 30% RH)

using a remodelled version of a Type V500 copying machine produced by Fuji Xerox Co., Ltd. The image quality was then evaluated. As a result, remarkable fog occurred, scattering of toner was observed, and a remarkable deterioration of image quality was recognized under both the two conditions. The fixability of the toner was then evaluated. As a result, the toner exhibited a good fixability at a temperature of 140° C. but showed offset at a temperature of 160° C. The developer was then evaluated for cleaning properties on electrostatic latent image carrier. As a result, the developer showed remarkably poor cleaning properties and a remarkably poor transferability to the transfer material.

EXAMPLE 17

The particulate resin dispersion (1), particulate resin dispersion (2), coloring agent dispersion (1) and releaser dispersion (1) were agglomerated with 3 g of zinc chloride instead of the cationic surface active agent (Sanizole B50, produced by Kao Corp.) as a flocculant in the same manner as in Comparative Example 1. These components were thoroughly subjected to mixing and dispersion in a round stainless steel flask by means of a homogenizer (Ultratalax T50, produced by LKA Corp.), and then heated to a temperature of 48° C. with stirring over a heating oil bath. The dispersion was then kept at the same temperature for 30 minutes. Thereafter, to the dispersion was then added slowly 60 g of the particulate resin dispersion (1). The temperature of the heating oil bath was then raised to 50° C. where the dispersion was then kept for 1 hour to obtain agglomerated particles.

The agglomerated particles thus obtained were then measured for volume-average particle diameter ($D_{50}$) by means of a coal tar counter (TAII, Nikkaki K.K.). The results were 6.0 μm. The volume-average particle size distribution coefficient (GSDv) was 1.25. To the dispersion of agglomerated particles was then added a 1N aqueous solution of NaOH to adjust the pH value thereof to 10 and stop the agglomeration of particles so that the agglomerated particles were stabilized. The stainless steel flask was then sealed. Using a magnetic seal, the dispersion was heated to a temperature of 90° C. with continuous stirring. The dispersion was then kept at the same temperature for 3 hours so that the agglomerated particles were fused. The particles thus fused were then measured for volume-average particle diameter ($D_{50}$) by means of a coal tar counter. The results were 6.1 μm. The volume-average particle size distribution coefficient (GSVd) was 1.23.

The fused particles were thoroughly washed with an aqueous alkali having a pH value of 10, with an acidic water having a pH value of 3 and then with ion-exchanged water, and then freeze-dried to obtain a particulate toner. The particulate toner thus obtained was then measured for water content. The results were 0.50%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using the same LUZEX image analyzer as used above, the particulate toner was then measured for shape factor SF in the same manner as in Comparative Example 1. The results were 130.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −20.0 μC/g under high temperature and high humidity conditions and −28.0 μC/g under low temperature and low humidity conditions. The particulate toner also exhibited an environmental dependence index as high as 0.71, demonstrating that it exhibits an excellent resistance to environmental dependence.

The foregoing particulate toner was then quantitatively determined for content of surface active agents remaining therein in the same manner as in Comparative Example 1. The results were 0.2% by weight (Since no cationic surface active agents were used in the present example, the content of cation-exchange material was zero). The residue after heat decomposition of 0.5 g of the particulate toner at 550° C. was dissolved in a 60% nitric acid solution. To the solution was then added ion-exchanged water to make 25 ml. Thereafter, the sample solution was quantitatively determined for amount of residual zinc from the flocculent by inductively coupled plasma spectrometry (ICP). The results were 30 ppm. The particulate toner was then measured for acid value by KOH titration method. The results were 9.5 mgKOH/g.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability. The developer was then evaluated for cleaning properties on electrostatic latent image carrier. As a result, the developer showed good cleaning properties and a good transferability to the transfer material.

EXAMPLE 18

The particulate resin dispersion (1), particulate resin dispersion (2), coloring agent dispersion (1) and releaser dispersion (1) were agglomerated with polyaluminum chloride as a flocculant at a temperature of 50° C. for 1 hour in the same manner as in Example 17. The dispersion of agglomerated particles thus obtained was then measured for pH at 50° C. The results were 3.5. To the dispersion was then added a 1N aqueous solution of NaOH so that it exhibited a pH value of 10 at 50° C. to stabilize the agglomerated particles. Thereafter, the agglomerated particles were then fused in the same manner as in Example 17 to obtain fused particles. The particles thus fused were then measured for volume-average particle diameter ($D_{50}$) by means of the same coal tar counter as used above. The results were 5.9 μm. The volume-average particle size distribution coefficient (GSVd) was 1.20.

The fused particles were thoroughly washed with an aqueous NaOH alkaline solution having a pH value of 10, with a nitrically acidic solution having a pH value of 3 and then with ion-exchanged water having a pH value of 6.5, and then freeze-dried to obtain a particulate toner. The particulate toner thus obtained was then measured for water content. The results were 0.49%. The particulate toner was then observed for surface conditions by an electron microscope. As a result, resin particles were observed fused to the surface of the core particles made of particulate resin, coloring agent and releaser to form a continuous layer. A section of the particulate toner was then observed by a transmission type electron microscope. As a result, little or no pigment was observed exposed at the surface layer. Using the same LUZEX image analyzer as used above, the particulate toner was then measured for shape factor SF in the same manner as in Comparative Example 1. The results were 128. The particulate toner was then measured for acid value by KOH titration method. The results were 9.8 mgKOH/g. The particulate toner was then quantitatively determined for content of surface active agents remaining therein in the same manner as in Example 1. The results were 0.2% by weight. The particulate toner also exhibited a flocculant metal salt content of 20 ppm.

The foregoing particulate toner was allowed to stand free of additives for 12 hours each under high temperature and high humidity conditions (28° C., 85% RH) and under low temperature and low humidity conditions (10° C., 30% RH), and then measured for chargeability (μC/g). As a result, the particulate toner exhibited a chargeability (Q/M) as good as −29.0 μC/g under high temperature and high humidity conditions and −35.0 μC/g under low temperature and low humidity conditions. The particulate toner also exhibited an environmental dependence index as high as 0.83, demonstrating that it exhibits an excellent resistance to environmental dependence.

In the same manner as in Comparative Example 1, to the foregoing particulate toner was then added hydrophobic silica. The mixture was then stirred by a sample mill. Using the same coat carrier as used in Comparative Example 1, a developer was prepared from the particulate toner in the same manner as in Comparative Example 1. The developer thus prepared was then subjected to duplication test of 10,000 sheets under high temperature and high humidity conditions (28° C., 85% RH) and under low temperature and low humidity conditions (10° C., 30% RH) using a remodelled version of a Type V500 copying machine produced by Fuji Xerox Co., Ltd. The image quality was then evaluated. As a result, little or no fog or toner scattering was observed under the two conditions, demonstrating that the developer exhibits almost good image forming properties. The fixability of the toner was then evaluated. As a result, the toner exhibited a good fixability at a temperature of 130° C. and showed no offset at a temperature of 230° C., demonstrating that the developer exhibits a good fixability. The developer was then evaluated for cleaning properties on electrostatic latent image carrier. As a result, the developer showed good cleaning properties and a good transferability to the transfer material.

TABLE 4

| | Comparative Example 2 | Example 17 | Example 18 |
|---|---|---|---|
| 1) Particulate resin St/BA/AA weight ratio | 92.5/7.5/1.5 | 92.5/7.5/1.5 | 92.5/7.5/1.5 |
| Particle diameter (μm) | 0.155 | 0.155 | 0.155 |
| Weight-average molecular weight | 13,000 | 13,000 | 13,000 |
| Tg (° C.) | 59 | 59 | 59 |
| 2) Particulate resin St/BA/AA weight ratio | 70/30/2 | 70/30/2 | 70/30/2 |
| Particle diameter (μm) | 0.105 | 0.105 | 0.105 |
| Weight-average molecular weight | 550,000 | 550,000 | 550,000 |
| Tg (° C.) | 53 | 53 | 53 |
| 3) Coloring agent | Carbon black | Carbon black | Carbon black |
| Particle diameter (μm) | 0.25 | 0.25 | 0.25 |
| 4) Releaser | HNP0190 | HNP0190 | HNP0190 |
| Particle diameter (μm) | 0.55 | 0.55 | 0.55 |
| 5) Flocculant | Sanizole B50 | Zinc chloride | Polyaluminum chloride |
| Treatment during fusion | Neogen R | Adjusted added to pH 10 | Adjusted to pH 10 |
| Washing Solution (pH) | Ion-exchanged water | Alkaline water (10) Acidic water (3) Ion-exchanged Water | Alkaline water (10) Acidic water (3) Ion-exchanged water |
| Toner | | | |
| Particle diameter (μm) | 6.1 | 6.1 | 5.9 |
| GSDv | 1.25 | 1.23 | 1.20 |

TABLE 4-continued

| | Comparative Example 2 | Example 17 | Example 18 |
|---|---|---|---|
| SF | 120 | 130 | 128 |
| Acid value (mgKOH/g) | 10.5 | 9.5 | 9.8 |
| Surface active agent content | 5.1 wt-% | 0.2 wt-% | 0.2 wt-% |
| Metal salt Content | — | 30 ppm | 20 ppm |
| Chargeability (μC/g) | | | |
| 23° C., 85% RH | −1 | −20 | −29 |
| 10° C., 30% RH | −12 | −28 | −35 |
| Environmental dependence index | 0.08 | 0.71 | 0.83 |
| Image quality | | | |
| Fog | Observed | None | None |
| Toner scattering | Observed | None | None |
| Fixability | Poor | Good | Good |

The comparison of Comparative Example 2 with Examples 17 to 22 shows that the restriction of the amount of surface active agents remaining in the toner, the use of a metal salt having a valence of two or more as a flocculent causing the remaining of the flocculent metal salt in the particulate toner in a predetermined amount resulting in the introduction of ion bond and the adjustment of the shape factor of the toner within the range of from 125 to 140 and the volume-average particle distribution GSDv to not more than 1.26 make it possible to provide a particulate toner having excellent chargeability, resistance to environmental dependence, cleaning properties, transferability and image quality.

In accordance with the present invention, an electrostatic image developing toner having small particle diameter, sharp particle size distribution, excellent chargeability, resistance to environmental resistance, transferability, fixability and cleaning properties which are well balanced, that can be by no means attained by the conventional agglomeration-fusion method using surface active agent, suspension polymerization method or knead-grinding method can be obtained by employing the foregoing constitution, particularly by a process which comprises preparing agglomerated particles with an inorganic metal salt, and then fusing the agglomerated particles to form a particulate toner. Further, the use of an electrostatic image developer comprising the electrostatic image developing toner makes it possible to form an image having an excellent quality.

What is claimed is:

1. A process for producing an electrostatic image developing toner, which comprises the steps of:

mixing at least one dispersion of particulate resin and at least one dispersion of coloring agent to prepare a mixture;

agglomerating the mixture with an inorganic metal salt having an electric charge having a valence of two or more, to prepare an agglomerate dispersion; and fusing the agglomerate to form a particulate toner, wherein the toner contains a surface active agent in an amount of not more than 3% by weight in the toner particulate and an inorganic metal salt having an electric charge having a valence of two or more in an amount of not more than 1% by weight.

2. The process according to claim 1, wherein the toner contains the inorganic metal salt in an amount of 10 ppm to 1% by weight.

3. The process according to claim 1, wherein the average diameters of the particulate resin and the coloring agent are not more than 1 μm.

4. The process according to claim 3, wherein the inorganic metal salt comprises at least one polymer of an inorganic metal salt.

5. The process according to claim 1, wherein the inorganic metal salt comprises at least one inorganic aluminum salt.

6. The process according to claim 1, wherein the mixture further comprises at least one dispersion of particulate releaser resin.

7. The process according to claim 1, which comprises:

forming the agglomerate in an aqueous medium;

after gettig the appropriate agglomerate particle size, adjusting the pH value of the agglomerate dispersion within the range of from 2.0 to 14 to stop the progress of the agglomeration of particles so that the agglomerate dispersion is stabilized; and heat-fusing the agglomerate.

8. The process according to claim 1, which comprises heat-fusing the agglomerate to form a particulate toner, and then washing the particulate toner with at least one of an alkali water and an acidic water.

9. The process according to claim 1, which comprises adding at least one dispersion of particulate resin to the agglomerate dispersion to cause the particulate resin to be attached to the surface of the agglomerate, and heat-fusing the material to form a particulate toner.

10. A process for producing an electrostatic image developing toner, which comprises the steps of:

mixing at least one dispersion of particulate resin and at least one dispersion of coloring agent to prepare a mixture;

agglomerating the particulate resin and coloring agent with a polymer of an inorganic metal salt, to prepare an agglomerate dispersion; and fusing the agglomerate to prepare a particulate toner.

11. The process according to claim 10, wherein the inorganic metal salt comprises at least one inorganic aluminum salt.

12. The process according to claim 10, wherein the inorganic metal salt is used in an amount of 10 ppm to 1% by weight.

13. The process according to claim 10, wherein the average diameters of the particulate resin and the coloring agent are not more than 1 μm.

14. The process according to claim 10, wherein the mixture further comprises at least one dispersion of particulate releaser resin.

15. The process according to claim 10, which comprises:

forming the agglomerate in an aqueous medium;

after getting the appropriate agglomerate particle size, adjusting the pH value of the agglomerate dispersion within the range of from 2.0 to 14 to stop the progress of the agglomeration of particles so that the agglomerate dispersion is stabilized; and heat-fusing the agglomerate.

16. The process according to claim 10, which comprises heat-fusing the agglomerate to form a particulate toner, and then washing the particulate toner with at least one of an alkali water and an acidic water.

17. The process according to claim 10, which comprises adding at least one dispersion of particulate resin to the agglomerate dispersion to cause the particulate resin to be attached to the surface of the agglomerate, and heat-fusing the material to form a particulate toner.

18. A toner obtained by the process according to claim 17.

* * * * *